(12) United States Patent
Sutton

(10) Patent No.: US 11,700,842 B2
(45) Date of Patent: Jul. 18, 2023

(54) VEHICLE FISHING ROD HOLDER

(71) Applicant: Christopher Sutton, Dunedin, FL (US)

(72) Inventor: Christopher Sutton, Dunedin, FL (US)

(73) Assignee: Christopher Sutton, Dunedin, FL (US)

( * ) Notice: Subject to any disclaimer, the term of this patent is extended or adjusted under 35 U.S.C. 154(b) by 0 days.

(21) Appl. No.: 17/731,554

(22) Filed: Apr. 28, 2022

(65) Prior Publication Data

US 2022/0248653 A1 Aug. 11, 2022

Related U.S. Application Data

(63) Continuation-in-part of application No. 16/927,973, filed on Jul. 13, 2020, now Pat. No. 11,570,977.

(51) Int. Cl.
*A01K 97/10* (2006.01)
*B60R 9/08* (2006.01)

(52) U.S. Cl.
CPC ............... *A01K 97/10* (2013.01); *B60R 9/08* (2013.01)

(58) Field of Classification Search
CPC .. A01K 97/10; B60R 9/06; B60R 9/08; B63B 25/002; B63B 34/05; B63B 35/14
See application file for complete search history.

(56) References Cited

U.S. PATENT DOCUMENTS

| | | |
|---|---|---|
| 5,184,797 A | 2/1993 | Hurner |
| 5,435,473 A * | 7/1995 | Larkum ................... B60R 9/08 |
| | | 211/70.8 |
| 5,460,306 A * | 10/1995 | Rudd .................... B60R 9/08 |
| | | 224/535 |
| 5,813,164 A | 9/1998 | Liberto |
| 6,357,166 B1 | 3/2002 | Malmanger |
| 6,739,084 B1 | 5/2004 | Hansen |
| 6,932,224 B1 | 8/2005 | Sandberg |
| 7,219,464 B1 * | 5/2007 | Kujawa ................ A01K 97/08 |
| | | 211/8 |
| 7,849,630 B2 | 12/2010 | Carnevali |
| 8,024,886 B2 * | 9/2011 | Sutherland ............ A01K 97/10 |
| | | 248/514 |
| 8,393,111 B1 * | 3/2013 | Johnson ................ A01K 97/10 |
| | | 43/21.2 |
| 8,746,469 B1 | 6/2014 | De La Torre |
| 8,875,963 B2 | 11/2014 | Knutson |
| 8,997,395 B2 | 4/2015 | Browne |
| 9,565,934 B2 | 2/2017 | Hall, II |
| 9,986,827 B1 | 6/2018 | Long |
| 2009/0084019 A1 * | 4/2009 | Carnevali ............. A01K 97/10 |
| | | 248/521 |
| 2010/0122487 A1 | 5/2010 | Snider |
| 2011/0232339 A1 | 9/2011 | Norman |

(Continued)

*Primary Examiner* — Richard G Davis
(74) *Attorney, Agent, or Firm* — Mark C. Johnson; Johnson Dalal

(57) ABSTRACT

A vehicle fishing rod holder with a rod holder body that is couplable to the bed of a truck in a locked configuration utilizing one or more mounting brackets. The rod holder body defines a holding channel for a fishing rod and a discontinuous slot for receiving a rod reel post of the fishing rod. A locking bar is coupled to the rod holder body and is operably configured to selectively lock the rod and reel into place by being positioned over the rod reel post. The rod holder body is also vertically adjustable using a clamping member and rotationally adjustable or pivoted using one or more arms.

18 Claims, 21 Drawing Sheets

(56) References Cited

U.S. PATENT DOCUMENTS

| | | |
|---|---|---|
| 2012/0110889 A1 | 5/2012 | Despiegelaere |
| 2014/0360086 A1 | 12/2014 | Finlan |
| 2017/0339937 A1 | 11/2017 | Erdmann |
| 2018/0110210 A1 | 4/2018 | Placko |
| 2018/0363330 A1 | 12/2018 | Brown |

* cited by examiner

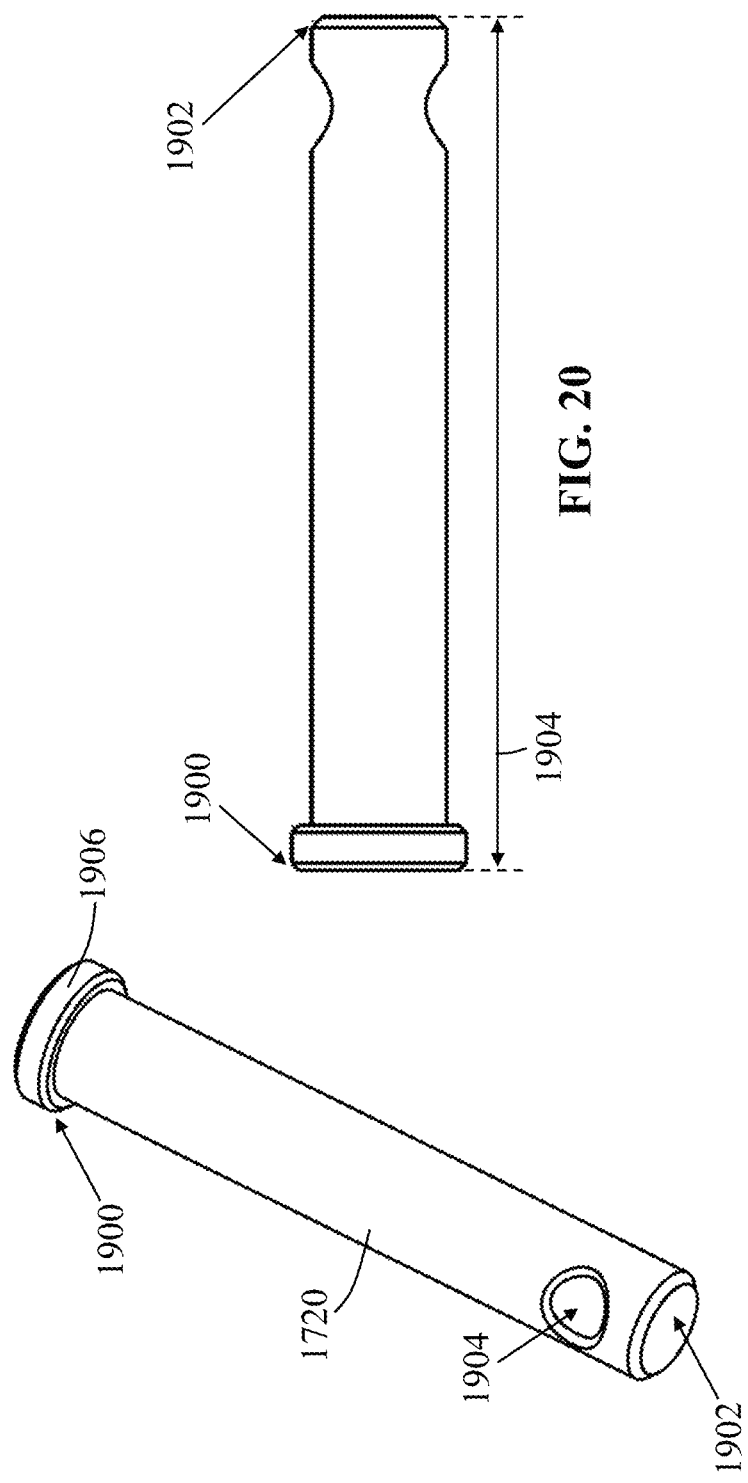

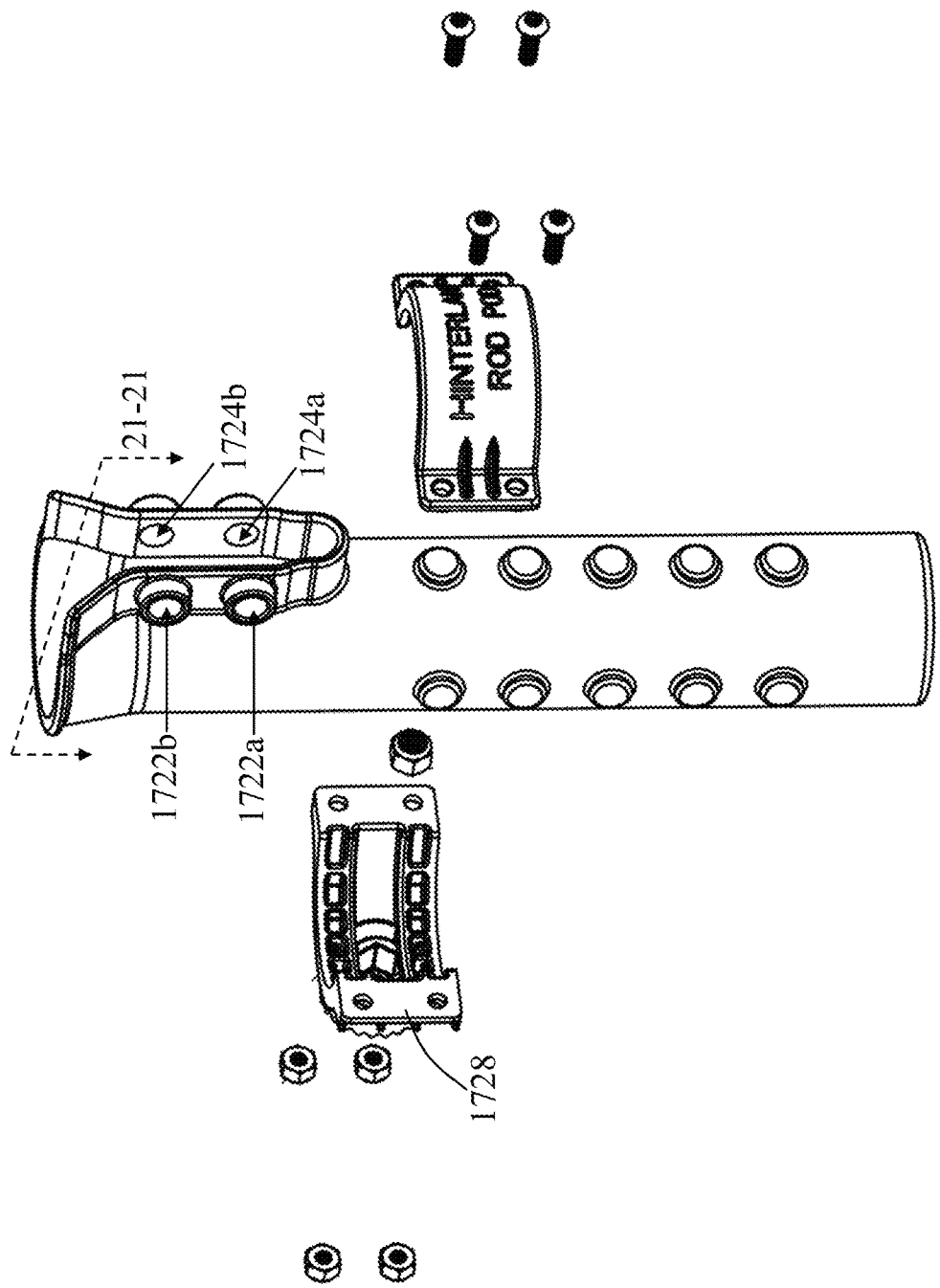

VEHICLE FISHING ROD HOLDER

FIELD OF THE INVENTION

The present invention relates generally to fishing rod holders, and, more particularly, relates to fishing rod holders selectively couplable to a vehicle, namely the bed of a pick-up truck.

BACKGROUND OF THE INVENTION

Whether professionally, recreationally, and/or for sport, many individuals all over the world engage in fishing. Many individuals utilize a fishing rod when fishing. The fishing rod is generally a long, flexible rod used by fishermen to catch fish, a line coupled thereto, and ending in a hook or "angle." The length of the rod can vary between approximately 2 and 20 feet. To entice fish, bait or lures are impaled on one or more hooks attached to the line. The line is generally stored on a reel that is offset from the rod and which reduces tangles and assists in landing a fish. Commonly, rods are made from fiberglass or carbon fiber and can often be expensive. The reels attached to the rods can also be expensive. Therefore, fishing equipment is often prone to theft. Further, user give extra care toward maintaining their fishing equipment.

Many users find transporting a rod to and from a body of water problematic. For example, the rod length can make carrying and transporting the rod impossible, impracticable, inconvenient, and unsafe. To solve said problem, many users attach one or more rods on top of a vehicle, inside a vehicle extending through one or more windows, and, if a pick-up truck is utilized, in the bed of a pick-up truck. When utilized in a pick-up truck, the rods and reels can become damaged during transport due to vibrational and other external forces. Moreover, the fishing rods are generally prone to theft if left unattended or while users are otherwise not watching the fishing rods.

Some known devices and method available to address the above concerns include straps, cumbersome housings, holders, and fasteners utilized to keep rods affixed to a surface of the vehicle. Many of these devices, however, are difficult and time-consuming to install and use, e.g., a user may be required to drill into the bed of a truck. Some of the permanent or semi-permanent devices are also expensive. Some known devices include housings that take up useable space from the bed of the trunk, which many users find problematic. Many known devices also do not effectively resist the possibility of theft in an efficient manner. Further, those known devices do not enable a user to effectively and efficiently organize, store, and/or adjust the orientation of the rod(s)/reel(s). Further, those known devices do not enable user to easily access rods without having to climb in bed or use assistance to retrieve rods. Additionally, other known devices do not allow them to be accessed easily, e.g., they stretch across the bed leaving a user without any or limited placement options.

Therefore, a need exists to overcome the problems with the prior art as discussed above.

SUMMARY OF THE INVENTION

The invention provides a vehicle fishing rod holder that overcomes the hereinafore-mentioned disadvantages of the heretofore-known devices and methods of this general type and that enables full adjustment and/or locking of a fishing rod, through the holder. Beneficially, the holder is operably configured to utilize the existing tie down designations in the bed of pick-up trucks such as Ford®, GMC® and Chevy® to create efficiency, organization, and security when storing and transporting fishing rod set ups. The present invention enables a quick and effective installation, a snug, organized, and compact fit of the holder on the vehicle, quick and effective rotational and lateral adjustment of the rod while being retained by the holder, and safe and effective retention of the rod while be retained by the holder.

With the foregoing and other objects in view, there is provided, in accordance with the invention, a vehicle fishing rod holder with a rod holder body having a sidewall with an upper end defining an upper aperture, a bottom end opposing the upper end, a body length separating the upper and bottom ends, an inner surface defining a holding channel spanning from the upper aperture toward the bottom end, an outer surface opposing the inner surface, defining at least two opposing locking apertures facing one another, and defining a discontinuous slot extending from the upper end and terminating along the body length, a locking bar selectively removably coupled to the rod holder body, selectively disposed in the at least two opposing locking apertures, disposed in a locked position having longitudinally restricted movement, disposed through the discontinuous slot, with a first end, with a second end opposing the first end of the locking bar, a locking bar length separating the first and second ends of the locking bar, and defining a locking aperture along the locking bar length, a locking fastener disposed in the locking aperture and operably configured to prevent the locking bar from being selectively removed from the rod holder body, and with a holder clamping member directly, translatably, and selectively removably coupled to the rod holder body and selectively rotatably coupled to a free end surface operably configured for selectively locked retention to a truck bed.

In accordance with another feature, an embodiment of the present invention includes the bottom end having a bottom aperture defined thereon, wherein the holding channel continuously spans and separates the upper aperture and the bottom aperture.

In accordance with a further feature of the present invention, the rod holder body is elongated and the holding channel is cylindrical.

In accordance with yet another feature, an embodiment of the present invention also includes a front plurality and a rear plurality of locking notches disposed longitudinally along the outer surface of the sidewall of the rod hold body and disposed, respectively, on opposing side surfaces of the sidewall of the rod hold body, wherein the holder clamping member includes front and rear locking notches disposed, respectively, on opposing side surfaces of the holder clamping member and that have a complementary coupling configuration with respect to the front plurality and a rear plurality of locking notches disposed on the outer surface of the sidewall of the rod hold body.

In accordance with an additional feature of the present invention, the front plurality and the rear plurality of locking notches extending at least 50% of the body length and equally spaced with respect to one another on the opposing side surfaces of the sidewall of the rod hold body.

In accordance with a further feature, an embodiment of the present invention also includes the outer surface of the sidewall of the rod hold body having a left plurality and a right plurality of locking notches disposed longitudinally along the outer surface of the sidewall of the rod hold body and disposed, respectively, on opposing side surfaces of the sidewall of the rod hold body, wherein the front plurality, the rear plurality, the left plurality and the right plurality of locking notches also extend at least 50% of the body length and are equally spaced with respect to one another on the respective opposing side surfaces of the sidewall of the rod hold body. The front plurality, the rear plurality, the left plurality and the right plurality of locking notches are of a complementary coupling configuration with respect to the front and rear locking notches and a left and a right locking notch, respectively, of the holder clamping member.

In accordance with an additional feature, an embodiment of the present invention also includes the holder clamping member has two collar members each with an inner surface having, respectively, the front plurality and the rear plurality of locking notches, the two collar members removably and directly coupled together with at least one fastener to contour and surround a perimeter of the outer surface of the rod holder body, the complementary coupling configuration restricting longitudinal movement of the rod holder body respect to the two collar members.

In accordance with yet another feature, an embodiment of the present invention also includes the holder clamping member having a serrated fastener selectively rotatably coupled in a rotationally locked position with respect to the mounting bracket through a complementary serrated fastener.

In accordance with an additional feature of the present invention, the locking aperture is disposed proximal to the second end of the locking bar In accordance with a further feature, an embodiment of the present invention also includes a second rod holder body having a sidewall with an upper end defining an upper aperture, a bottom end opposing the upper end of the sidewall of the second rod holder, a body length separating the upper and bottom ends of the sidewall of the second rod holder, an inner surface defining a holding channel spanning from the upper aperture toward the bottom end of the sidewall of the second rod holder, an outer surface opposing the inner surface of the sidewall of the second rod holder, defining at least two opposing locking apertures facing one another, and defining a discontinuous slot extending from the upper end of the sidewall of the second rod holder and terminating along the body length of the sidewall of the second rod holder, a locking bar selectively removably coupled to the rod holder body of the sidewall of the second rod holder, selectively disposed in the at least two opposing locking apertures defined by the sidewall of the second rod holder, disposed in a locked position having longitudinally restricted movement, disposed through the discontinuous slot defined by the sidewall of the second rod holder, with a first end, with a second end opposing the first end of the locking bar coupled to the second rod holder, a locking bar length separating the first and second ends of the locking bar coupled to the second rod holder, and defining a locking aperture along the locking bar length, a locking fastener disposed in the locking aperture defined by the locking bar coupled to the second rod holder and operably configured to prevent the locking bar from being selectively removed from the second rod holder body, and a holder clamping member directly, translatably, and selectively removably coupled to the second rod holder body and selectively rotatably coupled to the free end surface operably configured for selectively locked retention to the truck bed, and a first holder arm assembly coupled to the rod holder body and the free end surface and a second holder arm assembly coupled to the second rod holder body and the free end surface, the first and second holder arm assemblies operably configured to independently rotate the rod holder body and the second rod holder body, respectively, with respect to one another.

In accordance with an additional feature of the present invention, an intermediate pivoting member operably is utilized and configured to generate two joints operably configured to generate two degrees of freedom (DOF) rotationally and defining an aperture thereon shaped and sized to receive the locking bar therein.

In accordance with a further feature, an embodiment of the present invention also includes the holder clamping member having a serrated fastener selectively rotatably coupled in a rotationally locked position with respect to an end of either the first holder arm assembly or the second holder arm assembly through a complementary serrated fastener.

In accordance with a further feature, an embodiment of the present invention also includes the first holder arm assembly and the second holder arm assembly having a mounting member with both the first holder arm assembly and the second holder arm assembly directly coupled thereto and having at least one hinge member with the first holder arm assembly and the second holder arm assembly directly coupled thereto.

In accordance with yet another feature, an embodiment of the present invention also includes the sidewall of the rod holder body having a first plurality of locking apertures longitudinally aligned with one another and a second plurality of locking apertures longitudinally aligned with one another and each respectively facing at least one of the first plurality of locking apertures, wherein the locking bar is selectively disposed in one of the first plurality of locking apertures and one of the second plurality of locking apertures.

In accordance with yet another feature, an embodiment of the present invention also includes the locking bar having a flanged head disposed proximal to the first end of the locking bar and of a diameter greater than a diameter one of the least two opposing locking apertures.

Also in accordance with the present invention, a vehicle fishing rod holder is disclosed that includes a rod holder body having a sidewall with an upper end defining an upper aperture, a bottom end opposing the upper end, a body length separating the upper and bottom ends, an inner surface defining a holding channel spanning from the upper aperture toward the bottom end, an outer surface opposing the inner surface, defining a first plurality of locking apertures longitudinally aligned with one another, a second plurality of locking apertures longitudinally aligned with one another and each respectively facing at least one of the first plurality of locking apertures, and defining a discontinuous slot extending from the upper end and terminating along the body length, a locking bar selectively removably coupled to the rod holder body, selectively disposed in one of the first plurality of locking apertures and one of the second plurality of locking apertures, disposed in a locked position having longitudinally restricted movement, disposed through the discontinuous slot, with a first end, with a second end opposing the first end of the locking bar, a locking bar length separating the first and second ends of the locking bar, and defining a locking aperture along the locking bar length, and a locking fastener disposed in the locking aperture and operably configured to prevent the locking bar from being selectively removed from the rod holder body.

Although the invention is illustrated and described herein as embodied in a vehicle fishing rod holder, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the rod and holder, spanning from a bottom end to a top end thereon.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 19-20 depicts a perspective view and elevational view of the locking bar depicted in FIGS. 17-18 in accordance with one embodiment of the present invention;

FIGS. 21-23 are perspective views and one cross-sectional view along section line 21-21 of a rod holder body and a holder clamping member in accordance with one embodiment of the present invention.

DETAILED DESCRIPTION

Figure 1:
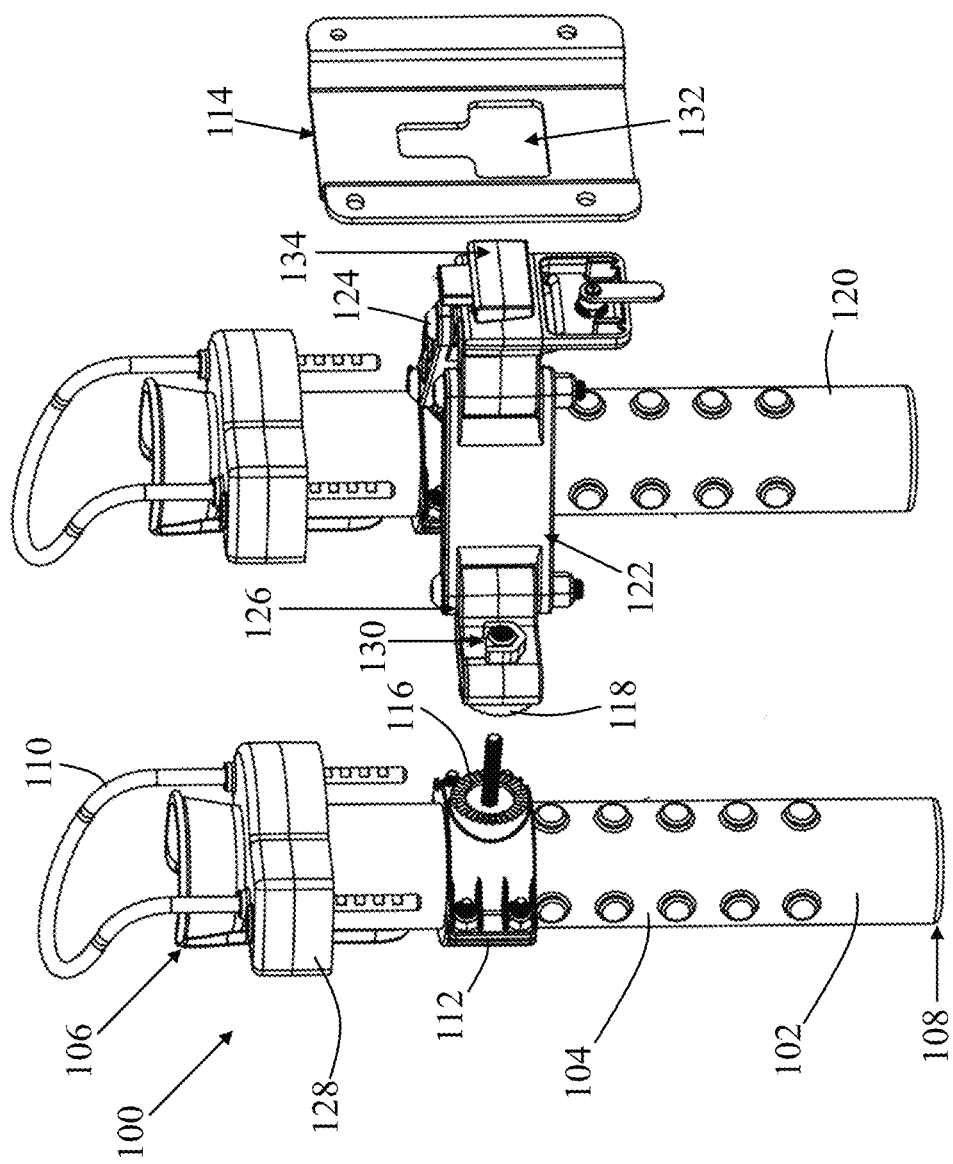
FIG. 1 is a perspective partially exploded view of a vehicle fishing rod holder in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
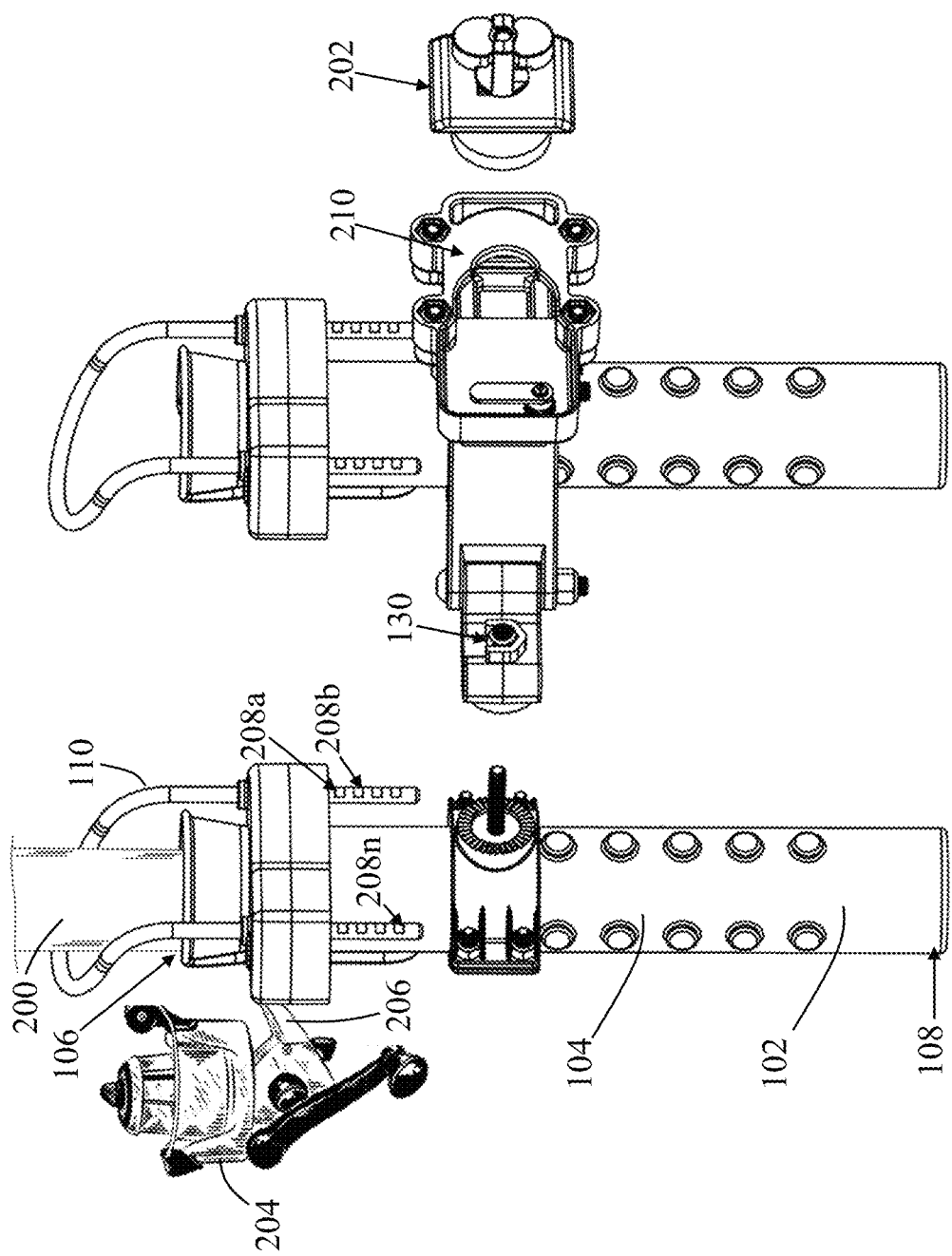
FIG. 2 is a perspective partially exploded view of a vehicle fishing rod holder in accordance with another embodiment of the present invention.
Figure 3:
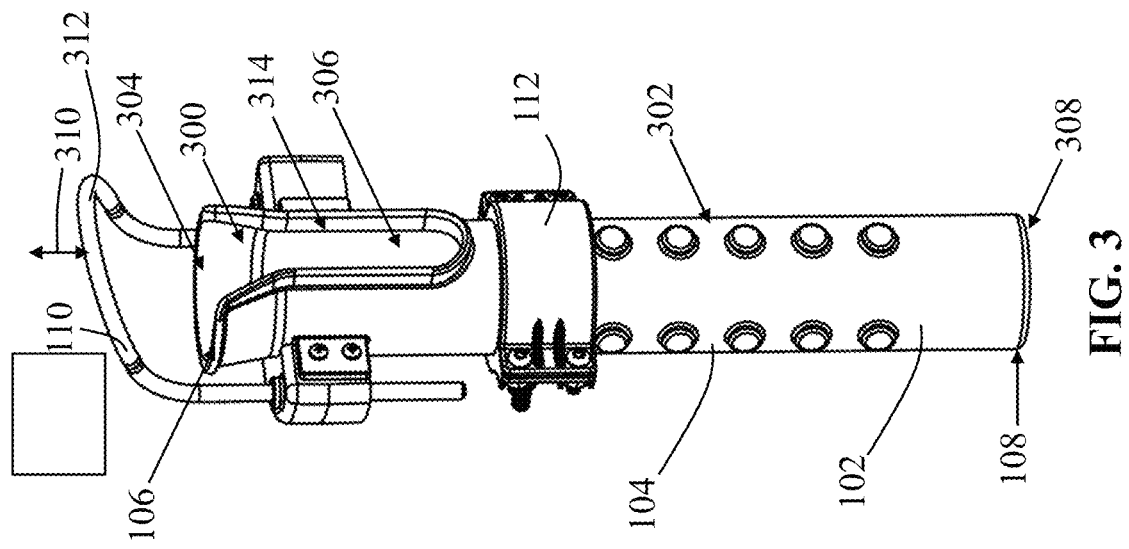
FIG. 3 is a perspective view of a rod holder body, a locking bar, and a holder clamping member of the vehicle fishing rod holder in FIG. 1 in accordance with one embodiment of the present invention.

The present invention provides a novel and efficient vehicle fishing rod holder that enables a user to safely, securely, efficiently, and effectively store one or more fishing rod(s) in vehicle, namely in the bed of a user's truck. Referring now to FIGS. 1-2, two embodiments of the present invention are shown in perspective views, wherein said embodiments vary based a bracket that may be utilized to effectuate attachment of the holder to the bed of a user's truck. Said figures (and those subsequent thereto) show several advantageous features of the present invention, but, as will be described below, the invention can be provided in several shapes, sizes, combinations of features and components, with adaptability to various truck beds, and varying numbers and functions of the components.

The first example of a vehicle fishing rod holder 100, as shown in FIGS. 1-2, includes a rod holder body 102, a locking bar 110 utilized to retain and secure a fishing rod 200, reel 204, and a reel post 206, and a holder clamping member 112 that couples the holder body 102 to a mounting bracket 114, 202 or other portion of a truck bed. Specifically, the mounting bracket 114 depicted in FIG. 1 is generally configured for attachment to a Ford® model truck bed and the mounting bracket 202 depicted in FIG. 2 is generally configured for attachment to a GM®, Dodge®, and Chevy® model truck beds. The vehicle fishing rod holder 100 may also a utilize bar collar 128 for receiving one or more portions of the locking bar 110, a plurality of movable arm assemblies 122, 124, and an arm bracket attachment or mounting member 136 having the free end surface 134 that will be prevented from movement when attached to a truck bed. The aforementioned components may of a substantially rigid and waterproof material, e.g., ABS plastic, stainless steel, etc. The aforementioned components facilitate in effectively, secure, safely, and efficiently storing and transporting a fishing rod 200 to the bed of a user's truck.

The vehicle fishing rod holder 100 may be utilized with a single rod holder body 102, but may also be beneficially utilized with a second rod holder body 120, a third rod holder body, etc. (depending on design constraints and applications). With reference to FIGS. 1-4, each of the rod holder bodies may include a sidewall 104 with an upper end 106, a bottom end 108 opposing the upper end 106 defining an upper aperture 304, a body length 400 separating the upper and bottom ends 106, 108, an inner surface 300 defining a holding channel 306 spanning from the upper aperture 304 toward the bottom end 108, an outer surface 302 opposing the inner surface 300, and may each define a discontinuous slot 314 extending from the upper end 106 and terminating along the body length 400. As used herein, the term "wall" is intended broadly to encompass continuous structures, as well as, separate structures that are coupled together so as to form a substantially continuous external surface. In one embodiment, the body length 400 is approximately 2-12 inches, but may lie outside of said range depending on design constraints and applications. However, the rod holder body 102 is sized and shaped such that it is operable (with the various adjustments described and depicted herein) to be placed against an interior side of the bed of a user's truck (often not extending passed the wheel well). Therefore, the size, shape, and adjustability of the rod holder body 102 results in maximum useable bed space, in addition to making accessing the retained rod(s) much easier, convenient, and safe over the prior art because a user is not required to climb over the side of the bed or otherwise climb inside the bed.

In one embodiment, the holder body 102 has an enclosed upper aperture 304 defined by the upper end 106, while in other embodiments, the discontinuous slot 314 is beneficially formed. The discontinuous slot 314 may span up to approximately 1-4 inches and may include an upper portion that is larger in width than a lower portion of the discontinuous slot 314 to effectively enable egress and entry of the reel post 206. The width of the entire discontinuous slot 314 should be greater, however, than a reel post 206, thereby enabling the post 206 to extend downwardly through the discontinuous slot 314 and rest on the part of the sidewall 104 forming the discontinuous slot 314. In some embodiments, the discontinuous slot 314 may be arcuate in portions to effectively receive the reel post 206. Further, the portion of the sidewall 104 forming the discontinuous slot 314 may be lined with a deformably resilient material or padding, e.g., neoprene, designed to dampen, support, retain, and protect the reel post when inserted into the discontinuous slot 314.

In one embodiment, the holder body 102 enables the handle and/or rod 200 portion of the fishing rod to only exceed no further than a bottom wall disposed at the bottom end 108 of the body 102. This may save on space in the truck bed. In other embodiments, the bottom end 108 defines a bottom aperture 308 defined thereon, wherein the holding channel 306 continuously spans and separates the upper aperture 304 and the bottom aperture 308. As such, the opening 308 enables a greater length of the rod 200 and/or handle to be inserted through the body 102, thereby accommodating more fishing rods lengths. The rod holder body 102 may be elongated (as depicted in the figures) and the holding channel 306 is cylindrical to save on space within a user's truck. Like the discontinuous slot 314, the holding channel 306, bottom aperture 308, and locking bar 110 may be lined with a deformably resilient material or padding.

To effectively retain the fishing rod, the locking bar 110 is coupled to the rod holder body 102 and operably configured to selectively translate longitudinally along a rod locking path 310 having various position. The rod locking path 310 is depicted as being linear, but may curvilinear, rotational, or a combination of the same. For example, a locked position along the rod locking path 310 (depicted best in FIG. 3 and FIG. 10) includes a portion 312 of the locking bar 110 positioned proximally adjacent to the discontinuous slot 314 defined by the sidewall 104 and having longitudinally restricted movement. Said another way, the locking bar 110 is positioned at or within approximately 2-6 inches from and/or within the discontinuous slot 314 to be positioned over the reel post 206 and/or reel 204 (e.g., a reel like shown in the figures or a bait caster, trolling reel, etc.). In a preferred embodiment the locking bar 110 is positioned proximally adjacent to the outer surface 302 of the sidewall 104 when in a locked position. In other embodiments, however, the locking bar 110 may be positioned proximally adjacent to the inner surface 300 of the sidewall 104. The locking bar 110 may be of a very rigid tube or bar material, e.g., stainless steel, and may beneficially include an upper circular and flexed/bent portion 506 that is configured to extend over the upper aperture 304 and have a diameter sufficient to receive the diameter of the rod 200 (best seen in FIG. 2). The locking bar 110 includes two portions 508, 510 extending continuously downwardly from the flexed/bent portion 506 and terminating at distal free ends.

Referring to FIGS. 1-3 and FIG. 5, the bar collar 128 can be seen having a contoured portion directly coupled to the outer surface 302 of the rod holder body 102, and defining two internal bar receiving channels, having an upper surface 500 defining two bar receiving apertures 502, 504 spatially coupled, respectively, to the two internal bar receiving channels. The bar collar 128 may be coupled to flanged bracket 422 using one or more fasten(s) or may be coupled in other methods, e.g., adhesive. The two internal bar receiving channels preferably continuously span through the bar collar 128, i.e., the bar collar is completely bored therethrough. The bar collar 128 may beneficially define a keyway aperture defined on an outer surface, e.g., the upper surface 500, thereof and include a keyed latch 514 encapsulated therein or otherwise coupled thereto, wherein the keyed latch 514 is accessible through the keyway aperture 512. Those of skill in the art will appreciate that the keyed latch 514 may be rotated and/or operated only through use of a key mated to operate the keyed latch 514. The two portions 508, 510 are disposed in the two internal bar receiving channels and the two bar receiving apertures 502, 504, respectively and are operably configured to linearly translate therein. The locking bar 110 may include a plurality of locking notches 208a-n (e.g., recess and/or ridges), wherein "n" represents any number greater than two, defined on each of the two portions 508, 510 of the locking bar 110.

The locking bar 110 is operably configured to have a plurality of locked positions along the rod locking path 310 with one of the plurality of locking notches 208a-n engaged with the keyed latch 514. Said another way, the locking bar 110 is operable to be positioned above the reel post 206 and/or reel 204 and prevented from longitudinal movement when in the locked position along the rod locking path 310. The locking bar 110 is also operable to have a removed position (depicted best in FIG. 5) with the portion 312 of the locking bar 110 not positioned proximally adjacent to the discontinuous slot 314 defined by the sidewall 104. Said another way, the removed position along the rod locking path 310 includes the portion 312 of the locking bar 110 structurally allowing entry and egress to the discontinuous slot 314 from a length of approximately 2-12 inches above the upper end 106 of the rod holder body 102. Advantageously, the locking bar 110 is operable to be completely removed from the upper aperture 304 and slot 314 to allow quick, efficient, and uninhibited entry and egress of the fishing rod 200 and reel 204 to and from the holding channel 306.

Figure 4:
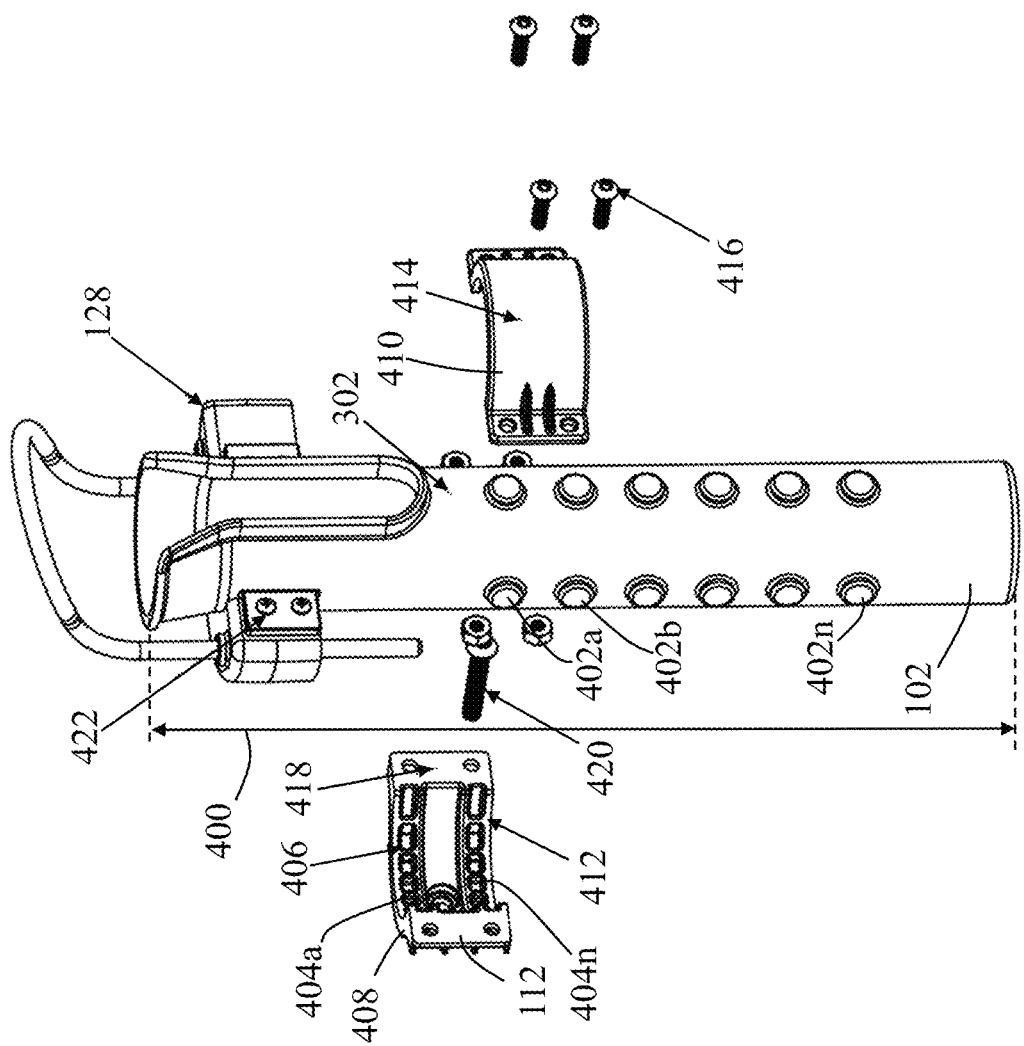
FIG. 4 is an exploded view of the rod holder body, the locking bar, and the holder clamping member depicted in FIG. 3.
Figure 5:
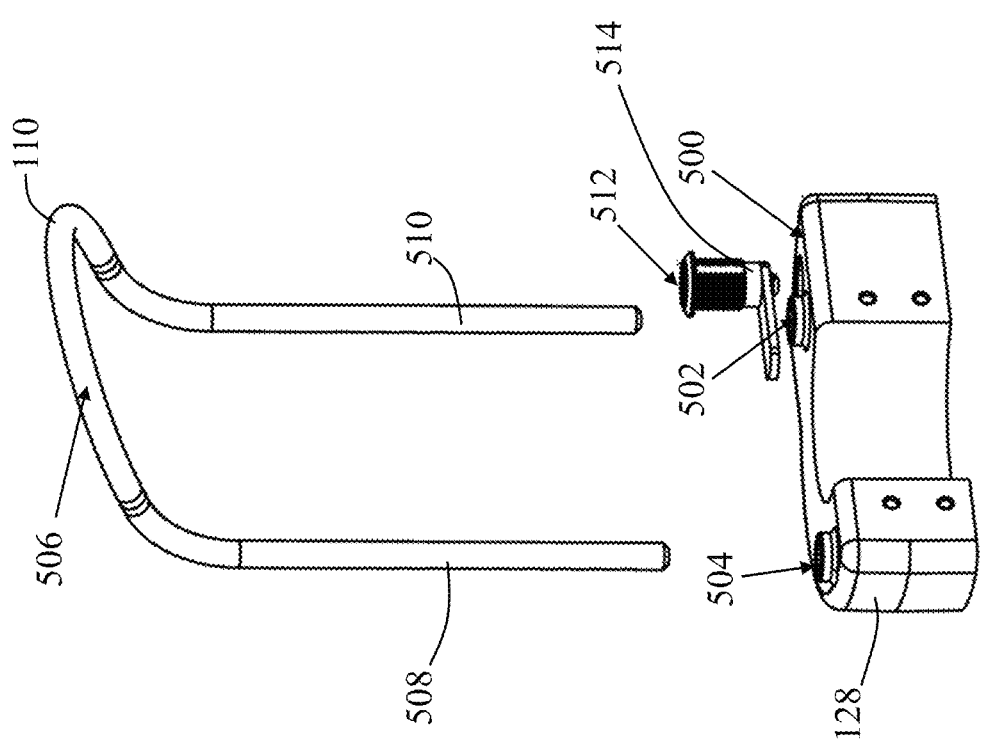
FIG. 5 is an exploded view of the locking bar depicted in FIG. 3.

As seen in FIG. 1 and FIG. 4, a holder clamping member 112 may be utilized that is directly, translatably, and selectively removably coupled to the rod holder body 102 to enable quick and effective vertical adjustment of a holder body 102. The holder clamping member 112 may be selectively rotatably coupled to a free end surface (e.g., surfaces 134, 210) that is couplable to a mounting bracket 114, 202 that may also have a free surface operably configured for selectively locked retention to a truck bed, e.g., using the tie-down configuration of a truck bed. More specifically, in one embodiment, the holder body 102 may include a front plurality and a rear plurality of locking notches 402a-n disposed longitudinally along the outer surface 302 of the sidewall 104 thereof. The locking notches 402a-n may consist of recesses, ridges, or a combination of the same to enable a mating attachment with the holder clamping member 112. The locking notches 402a-n may be disposed, respectively, on opposing side surfaces of the sidewall 104 of the rod hold body 102, wherein the holder clamping member 112 includes front and rear locking notches 404a-n disposed, respectively, on opposing side surfaces 406 of the holder clamping member 112 (wherein rear locking notches are not depicted but are the same configuration, size, and/or shape as the front locking notches). The front and rear locking notches 404a-n would have a complementary coupling configuration with respect to the front plurality and a rear plurality of locking notches 402a-n disposed on the outer surface 302 of the sidewall 104 of the rod hold body 102, thereby preventing longitudinal and/or linear translation of the holder body 102 unless desired by the user. Said another way, the user may selectively adjust the height of the holder body 102 with respect to the holder clamping member 112 and the mounting bracket 114, 202.

In one embodiment, the plurality of locking notches 402a-n, 404a may be cylindrical knobs and complementary recesses configured to mate with one another, but may have other shapes, sizes, and configurations enabling a secure or locked coupling configuration. In one embodiment, the user may selectively adjust the height of the holder bodies by unfastening or coupling two collar members 408, 410 from one another with one or more fasteners, e.g., fastener 416. The two collar members 408, 410 may each include an inner surface 412 having, respectively, the front plurality and the rear plurality of locking notches 402a-n. The two collar members 408, 410 may be removably and directly coupled together with at least one fastener to contour and surround a perimeter of the outer surface 302 of the rod holder body 102. The two collar members 408, 410 may directly couple together with a flange, e.g., flange 418, extending outwardly therefrom. The complementary coupling configuration of the locking notches 402a-n, 404a-n beneficially restricts longitudinal movement of the rod holder body 102 respect to the two collar members 408, 410. The collar member 408 may be directly coupled to the mounting bracket 114, 202 or the holder arm assembly 122 (as depicted in the figures).

In another embodiment of the present invention, the front plurality and the rear plurality of locking notches 402a-n extend 30%, or in some embodiments at least 50%, of the body length 400 and are equally spaced with respect to one another on the opposing side surfaces of the sidewall 104 of the rod hold body 102. Further, each of the front plurality and the rear plurality of locking notches 402a-n may be spaced approximately 1 inch apart, thereby allowing for selective vertical adjustment for rods of varying length, e.g., 6-20 feet. In additional embodiments, the outer surface 302 of the sidewall 104 of the rod hold body 102 also includes a left plurality and a right plurality of locking notches 402a-n disposed longitudinally along the outer surface 302 of the sidewall 104 of the rod hold body 102, wherein the left plurality and a right plurality of locking notches 402a-n are disposed, respectively, on opposing side surfaces of the sidewall 104 of the rod hold body 102. Providing locking knobs on two opposing sides enables max resistance, wherein in other embodiments a perimeter flange may be utilized to lock the rod holder 102 to the holder clamping member 112. However, when locking notches are utilized, one embodiment includes the front plurality, the rear plurality, the left plurality and the right plurality of locking notches 402a-n each extending at least 50% of the body length 400 and equally spaced with respect to one another on the respective opposing side surfaces of the sidewall 104 of the rod hold body 102 and of a complementary coupling configuration with respect to the front and rear locking notches 404a-n and a left and a right locking notch, respectively, of the holder clamping member 112.

Figure 6:
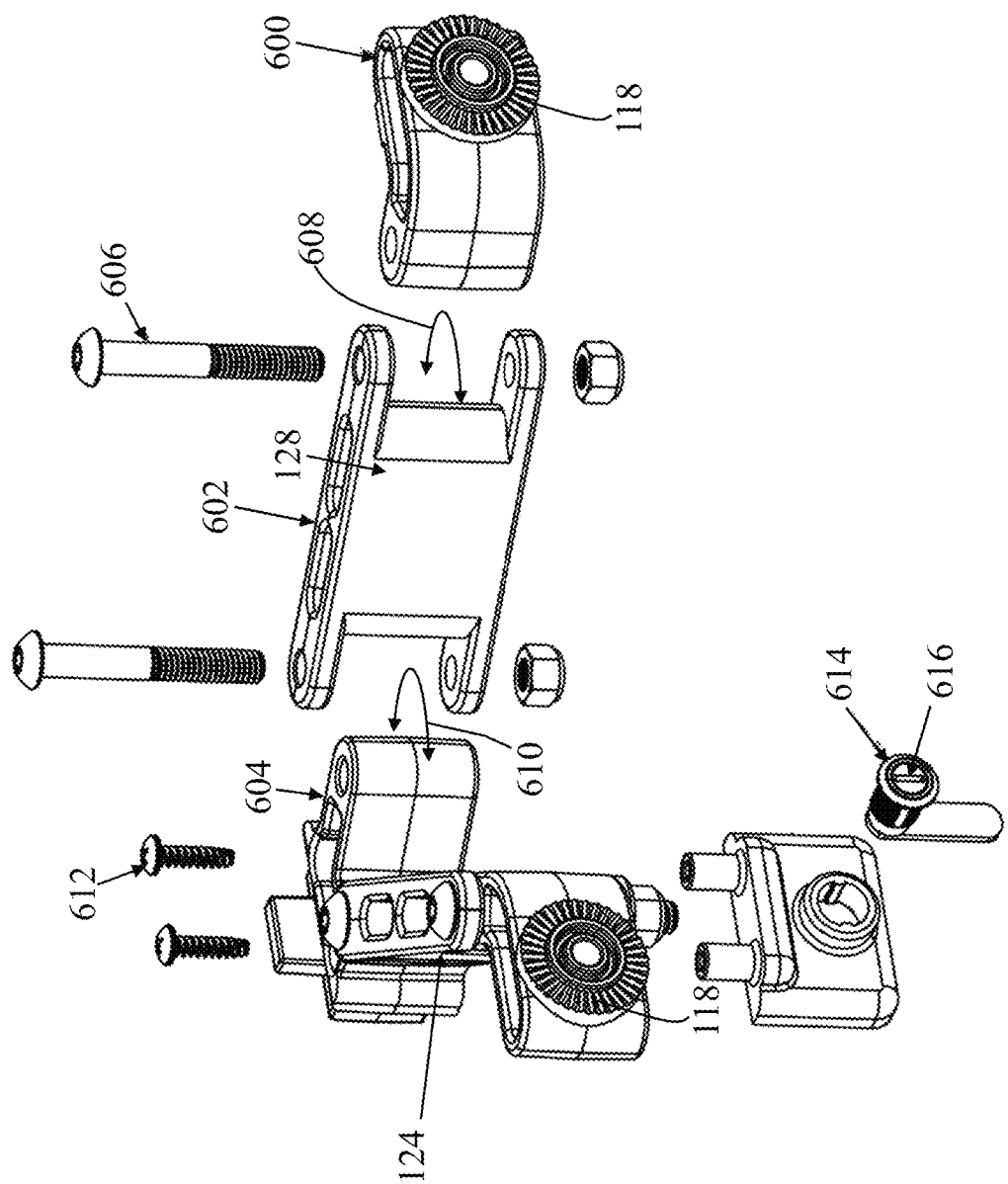
FIG. 6 is an exploded view of a plurality of arms of the vehicle fishing rod holder in FIG. 1 in accordance with one embodiment of the present invention.

With reference to FIG. 1 and FIG. 6, the clamping member 112 includes a serrated fastener 116 selectively rotatably coupled in a rotationally locked position with respect to the mounting bracket 114, 202 through a complementary serrated fastener 118. In one embodiment, the rod holder 102 is operable to rotate 360° by selectively uncoupling the serrated fastener 116 with respect to the complementary serrated fastener 118 and then coupling or fastening them together, e.g., with a fastener 420 and nut 130 so that rotational movement is prevented. In another embodiment of the present invention, a spring may be utilized and coupled with the fasteners 116, 118, thereby causing a biasing compression force keeping the two fasteners joined together. When the user desires to rotate the rod holder 102, he or she will quickly and efficiently pull the rod holder 102 and rotate to the desired angle.

In another embodiment of the present invention, a first holder arm assembly 122 is coupled to the rod holder body 102 and the mounting bracket 114 and a second holder arm assembly 124 coupled to the second rod holder body 120 and the mounting bracket 114. The first and second holder arm assemblies 122, 124 may then be operably configured to independently rotate the rod holder body 102 and the second rod holder body 120, respectively, with respect to one another. Additionally, the first holder arm assembly 122 and the second holder arm assembly 124 may also each have two joints, e.g., joint 126, operably configured to generate two degrees of freedom (DOF) rotationally. The holder arm assemblies 122, 124 may each have the serrated fastener 118 coupled to an end thereof, allowing independent rotation and pivoting of two adjacent rod holders, thereby providing more adjustability for each rod desired to be retained. As seen best in FIG. 6, each of the holder arm assemblies may include three sections forming the joints, i.e., a distal pivoting member 600, an intermediate pivoting member 602, and a mounting member 604 (all connected together with one or more fastener(s), e.g., fastener 606). The sectioned holder arm assembly 122 beneficially enables both distal pivoting or rotation (approximately 180° and represented with arrow 608) and wide range pivoting or rotation (approximately 180° and represented with arrow 610).

With reference to FIGS. 6-13, the mounting member 604 may include two apertures formed thereon for receiving one or more fastener(s) (e.g., fastener 612) that directly couples to a mounting keyed latch 614 that may be encapsulated in or otherwise coupled to the mounting member 604. Said another way, the mounting member 604 has both the first holder arm assembly 122 and the second holder arm assembly 124 directly coupled thereto and includes at least one hinge member with the first holder arm assembly 122 and the second holder arm assembly 124 directly coupled thereto. As seen best in FIG. 6, the first holder arm assembly 122 and the second holder arm assembly 124 share the mounting member 604 as a joint, enabling the two holder bodies 102, 120 to pivot to a substantially planar position with respect to one another. The mounting member 604 may also define a mounting keyway aperture 616 defined on an outer surface thereof and includes a mounting keyed latch 614 coupled thereto. The mounting keyed latch 614 is accessible through the mounting keyway aperture 616 and is operably configured to lockedly engage with the mounting bracket 114, 202, thereby providing additional attachment security for the holder assembly 100. Although the assembly 100 may beneficially utilize a mounting keyed latch thereon, in alternative embodiments of the present invention, a latch may be locked in position with a padlock or other selectively removable structure (instead of using a key) that is inserted through the keyway aperture.

Figure 7:
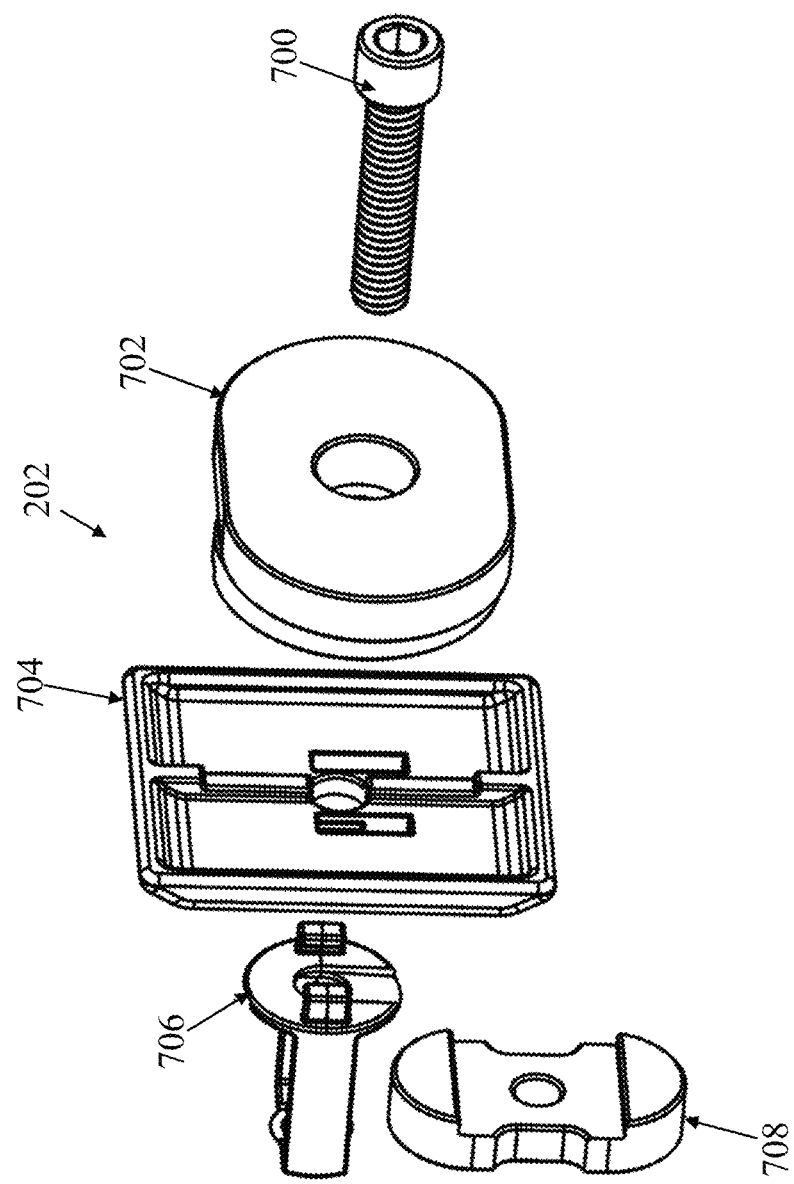
FIG. 7 is a perspective view of a mounting bracket of the vehicle fishing rod holder in FIG. 2 in accordance with one embodiment of the present invention.
Figure 8:
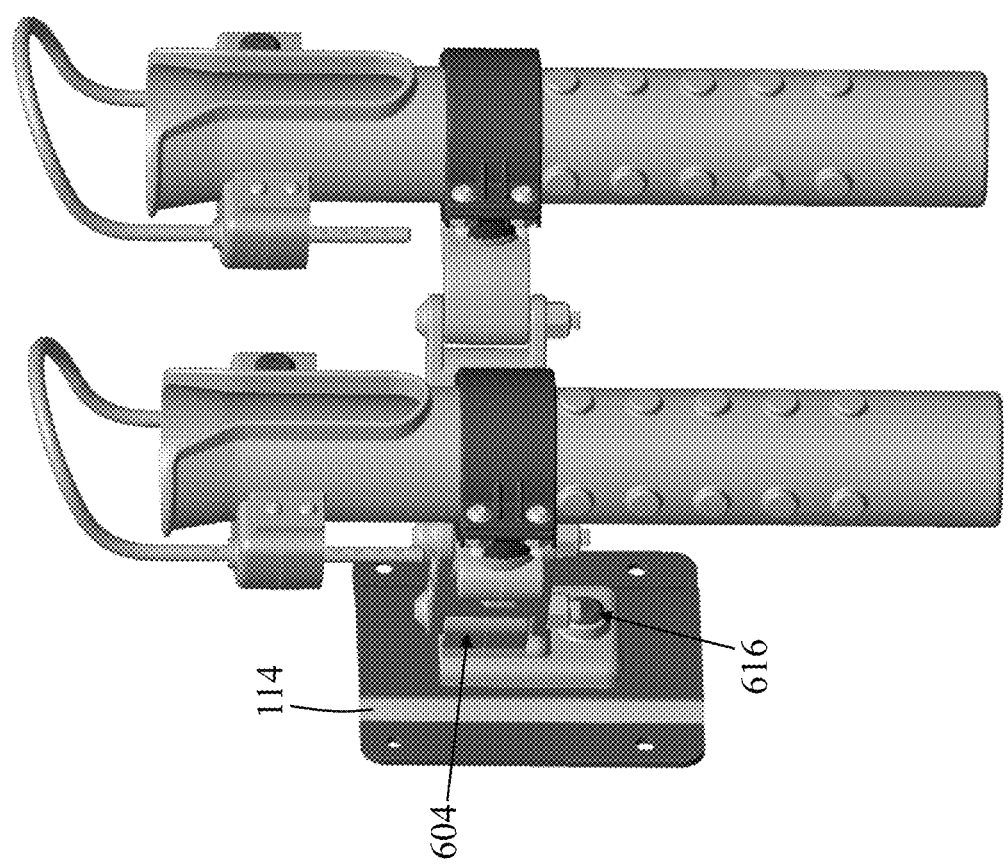
FIGS. 8-9 are left- and right-side perspective views, respectively, of the vehicle fishing rod holder in FIG. 1 in accordance with one embodiment of the present invention in accordance with the present invention.
Figure 9:
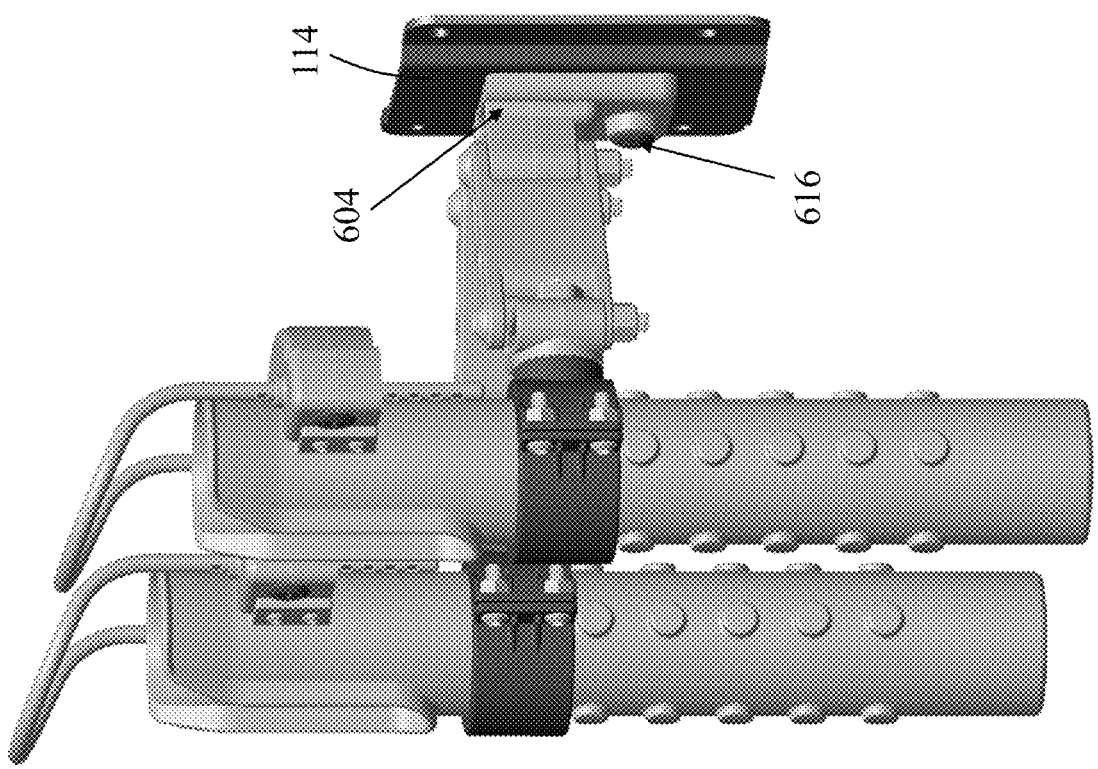
Figure 10:
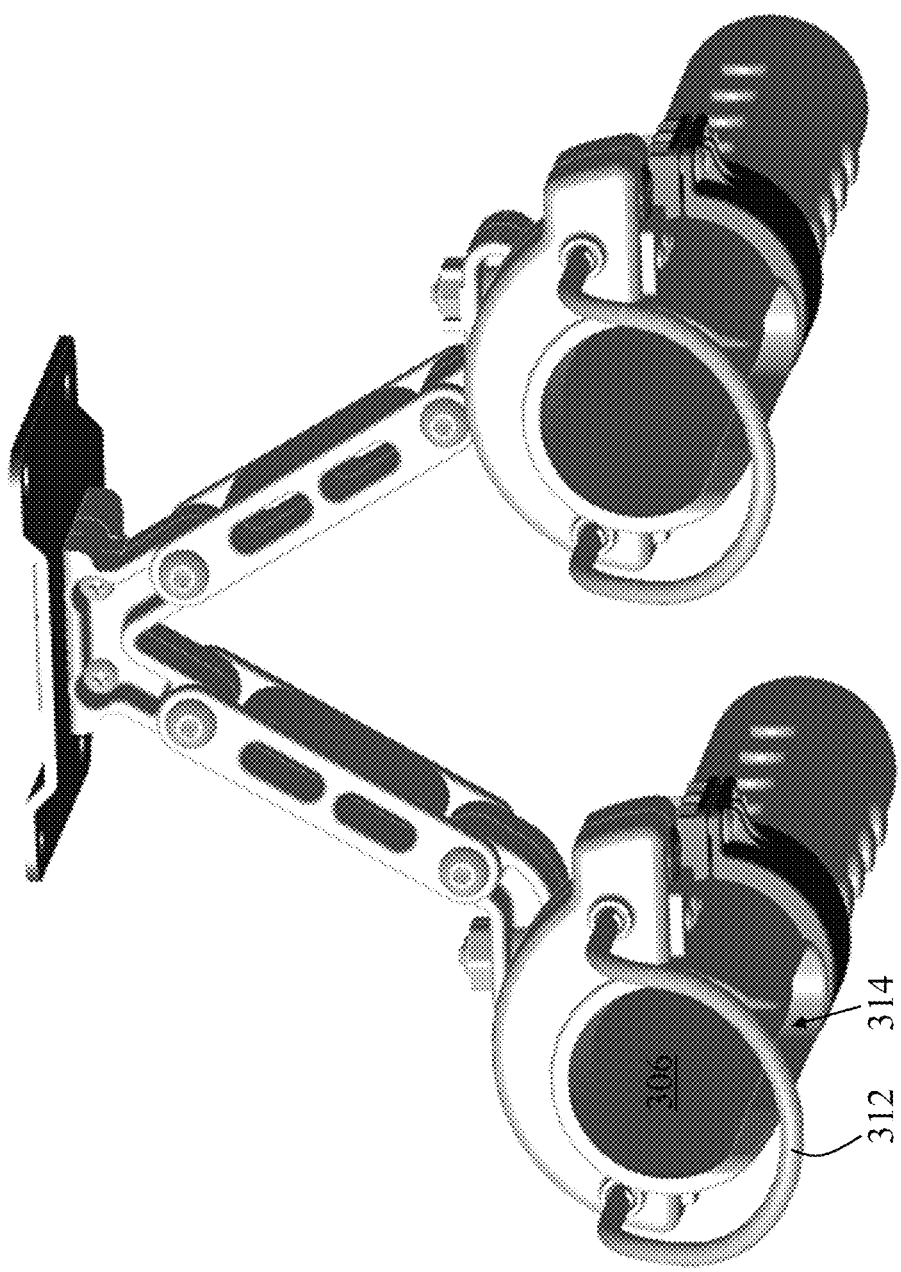
FIG. 10 is an overhead view of the vehicle fishing rod holder in FIG. 1 in accordance with one embodiment of the present invention.
Figure 11:
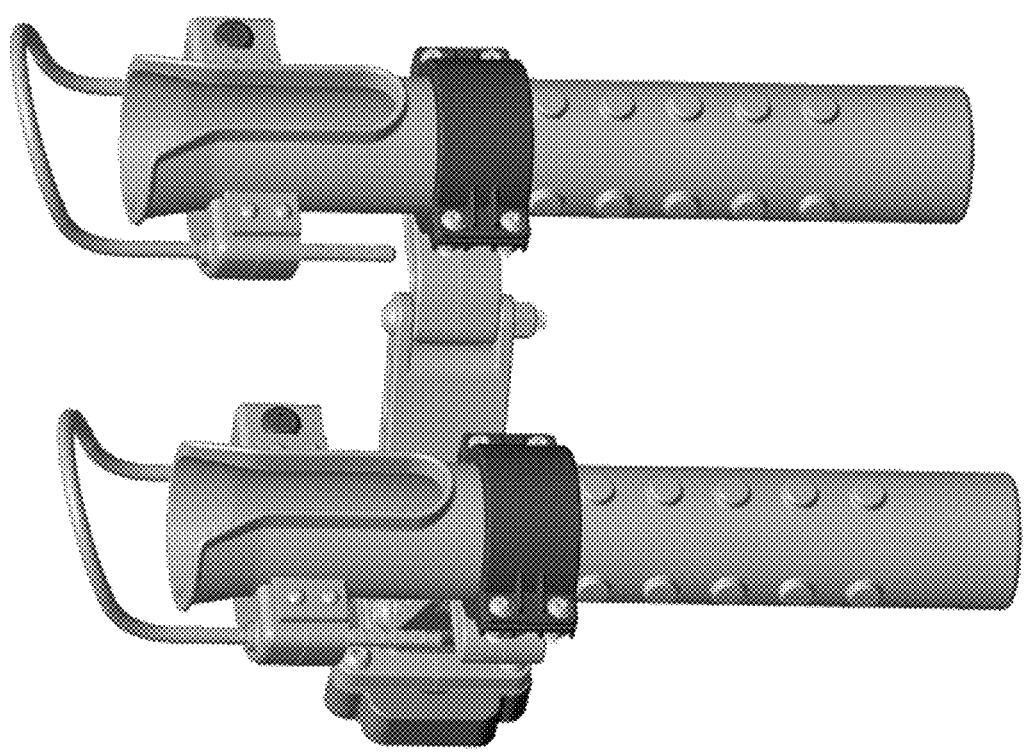
FIGS. 11-12 are left- and right-side perspective views, respectively, of the vehicle fishing rod holder in FIG. 2 in accordance with one embodiment of the present invention.
Figure 12:
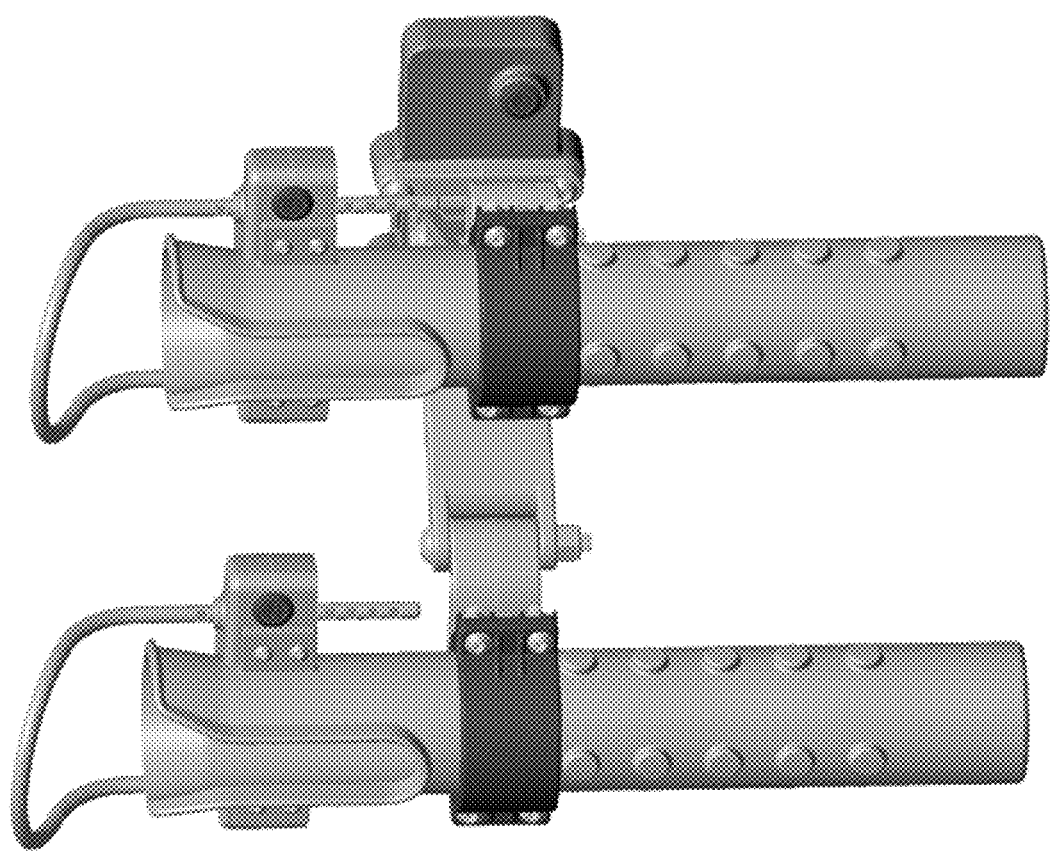
Figure 13:
FIG. 13 is an overhead view of the vehicle fishing rod holder in FIG. 2 in accordance with one embodiment of the present invention.
Figure 14:
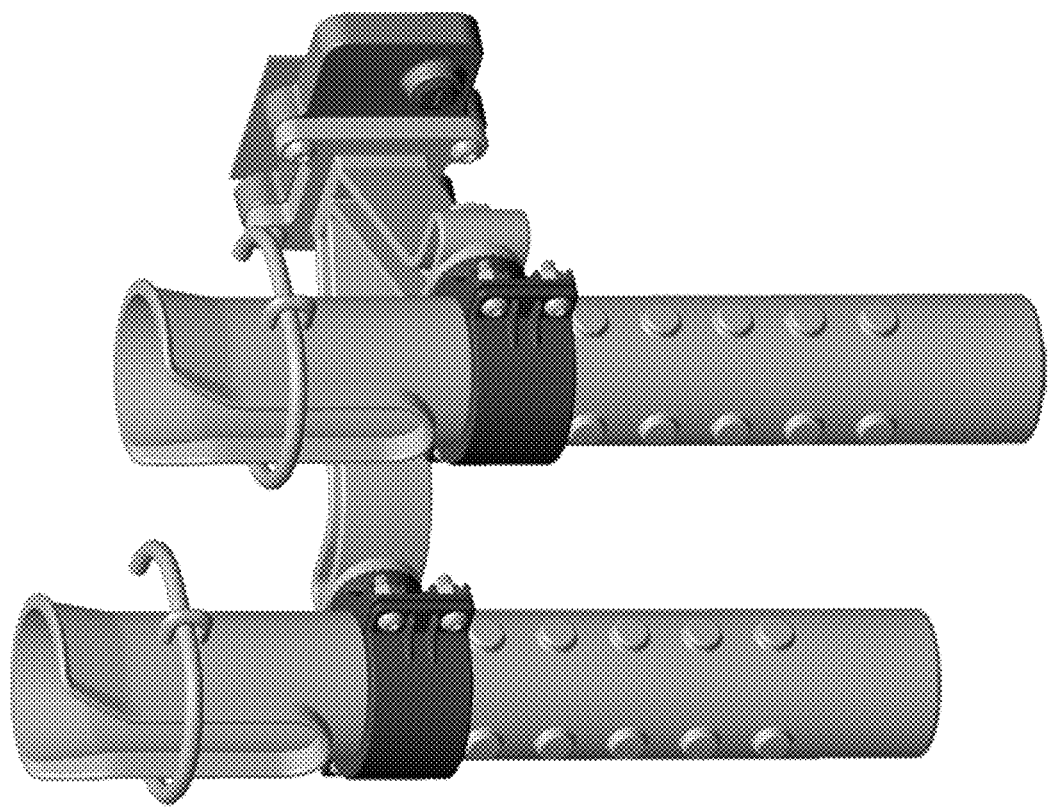
FIGS. 14-16 are perspective views of a vehicle fishing rod holder in accordance with another embodiment of the present invention.
Figure 15:
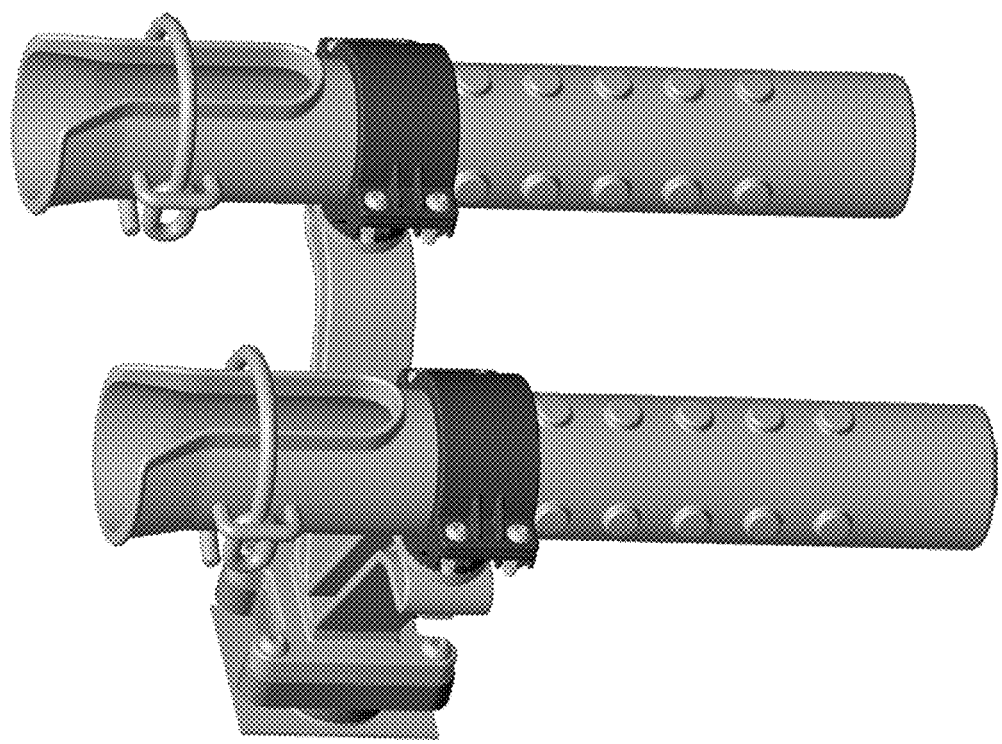
Figure 16:
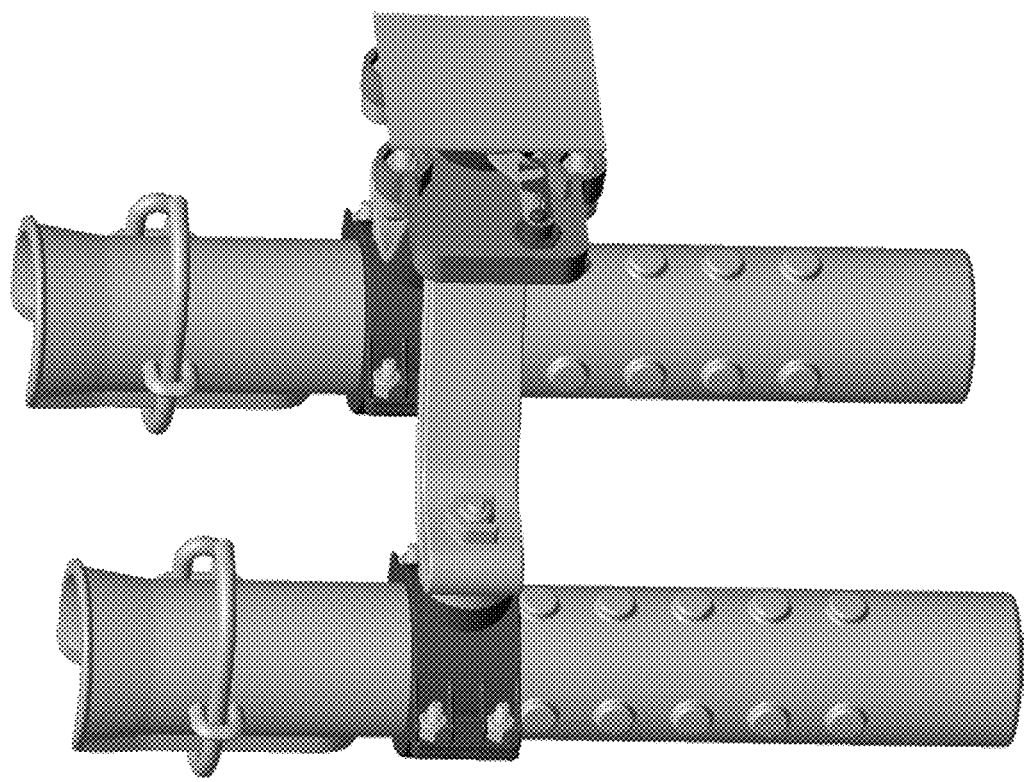

FIG. 1 and FIGS. 8-10 depict the bracket 114 configured for placement in the bed of a user's truck using the pre-drilled holes. Beneficially, the bracket 114 includes a mounting aperture 132 shaped, sized, and configured to receive the mounting member 604. The mounting aperture 132 may beneficially include a first portion sized to be greater than a portion of the mounting member 604 and a second portion sized to be smaller than a portion of the mounting member 604, thereby enabling the mounting member 604 to slidably engage with the mounting bracket 114 and lock thereto. FIG. 7 also more closely depicts the mounting bracket 202 in FIG. 2, which enables placement of the mounting bracket 202 in an alternative truck bed location using a fastener 700, a bushing 702, mounting plate 704, and mounting locks 706, 708. FIGS. 8-10 depict similar features to the assembly 100 in FIG. 1, but depict alternative locations for keyway apertures. Similarly, FIGS. 11-13 depict similar features to the assembly 100 in FIG. 2, but depict alternative locations for keyway apertures. As such, user is provided with increased placement flexibility, as the rod holder 100 will fit in any designated tie down spots (for various vehicle makes) without any drilling to add new holes in the truck or without welding or using permanent and semi-permanent methods.

Although a specific order of installation and coupling steps has been disclosed, the order of executing the steps may be changed relative to the order shown in certain embodiments. Also, two or more steps shown in succession may be executed concurrently or with partial concurrence in some embodiments. Certain steps may also be omitted for the sake of brevity. In some embodiments, some or all of the process steps can be combined into a single process.

Figure 18:
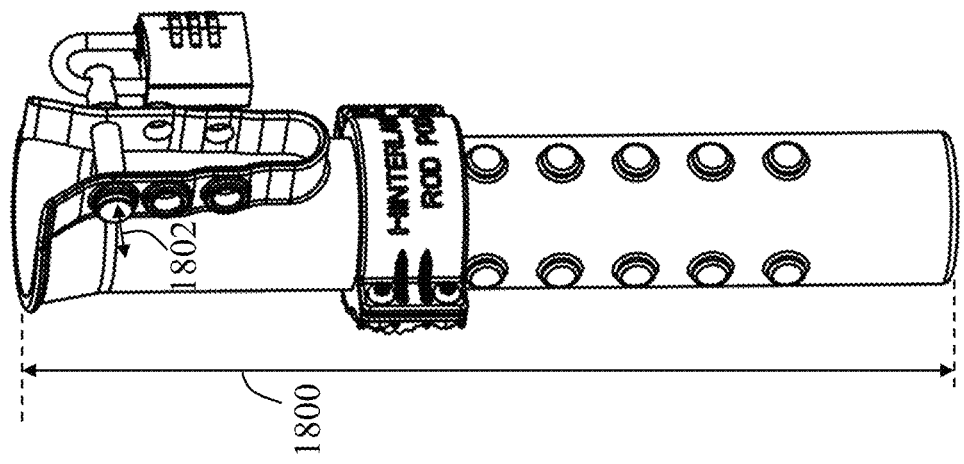
FIGS. 17-18 are perspective views of a rod holder body, a locking bar, and a holder clamping member in accordance with one embodiment of the present invention.
Figure 17:
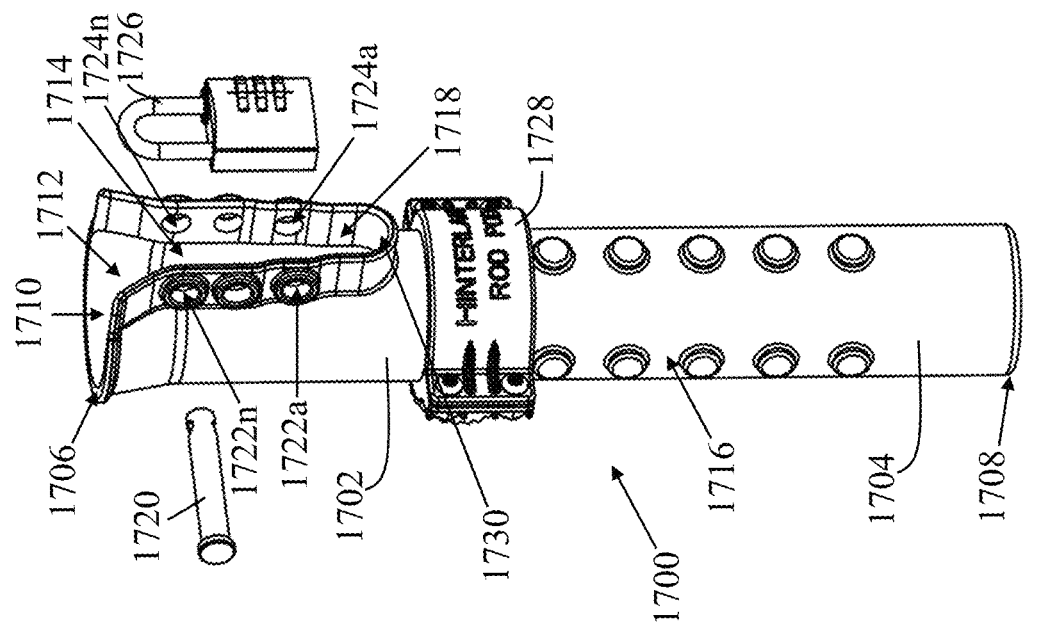

For example, and with reference to FIGS. 17-18, another embodiment of a vehicle fishing rod holder 1700 is depicted that has many of the same features exemplified in FIGS. 1-2 and previously described above. For example, the vehicle fishing rod holder 1700 is also operably configured to retain and secure a fishing rod, that includes the rod 200, reel 204, and reel post 206 depicted in FIG. 2. Similarly, the assembly 1700 includes a rod holder body 1702, a locking bar 1720, and a holder clamping member 1728 that couples the holder body 1702 to a mounting bracket 114, 202 (depicted in FIGS. 1-2) or other portion of a truck bed. Specifically, the mounting bracket 114 depicted in FIG. 1 is generally configured for attachment to a Ford® model truck bed and the mounting bracket 202 depicted in FIG. 2 is generally configured for attachment to a GM®, Dodge®, and Chevy® model truck beds. The vehicle fishing rod holder 1700 may also a utilize bar collar 128 for receiving one or more portions of the locking bar 1720, a plurality of movable arm assemblies 122, 124, and an arm bracket attachment or mounting member 136 having the free end surface 134 that will be prevented from movement when attached to a truck bed. The aforementioned components may also be of a substantially rigid and waterproof material, e.g., ABS plastic, stainless steel, etc. The aforementioned components facilitate in effectively, secure, safely, and efficiently storing and transporting a fishing rod 200 to the bed of a user's truck.

Figure 23:
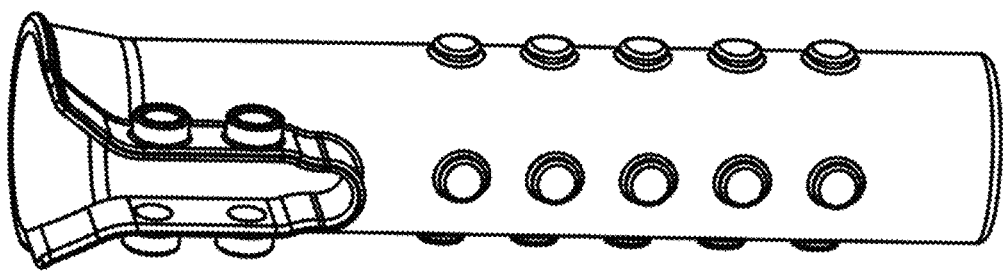
Figure 22:
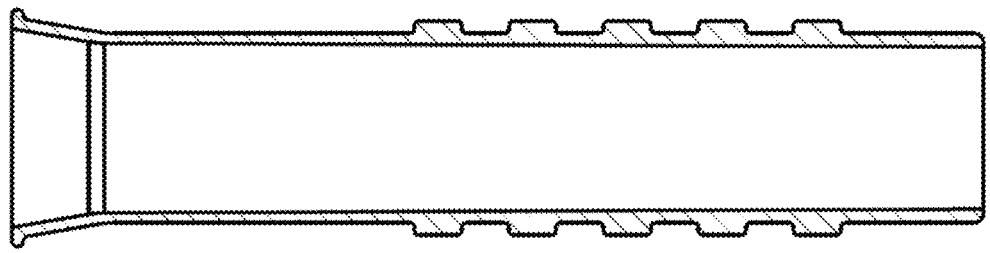

More specifically and with reference to the embodiment depicted in FIGS. 17-18, the rod holder body 1702 has a sidewall 1704 with an upper end 1706 defining an upper aperture 1710, a bottom end 1708 opposing the upper end 1706, a body length 1800 separating the upper and bottom ends 1706, 1708, an inner surface 1712 defining a holding channel 1714 spanning from the upper aperture 1710 toward the bottom end 1708, and an outer surface 1716 opposing the inner surface 1712. The sidewall 1704 also beneficially defines at least two opposing locking apertures 1722a, 1724a facing one another (as exemplified in the FIGS. 17-18). In a preferred embodiment, the sidewall 1704 of the rod holder body 1702 includes a first plurality of locking apertures 1722a-n longitudinally aligned with one another and a second plurality of locking apertures 1724a-n longitudinally aligned with one another, wherein "n" represents any number greater than one. For example, the rod holder body 1702 depicted in FIGS. 17-18 includes three locking apertures 1722a-n disposed on one side of the sidewall 1704 and three locking apertures 1724a-n disposed on another opposing side of the sidewall 1704 that defines a discontinuous slot 1718 extending from the upper end 1706 and terminating along the body length 1800. In another embodiment, the rod holder body 1702 depicted in FIGS. 21-23 includes two locking apertures 1722a-b disposed on one side of the sidewall 1704 and two locking apertures 1724a-b disposed on another opposing side of the sidewall 1704 that defines the discontinuous slot 1718.

In one embodiment, the sidewall 1704 is generally cylindrical and includes a flange portion defining the discontinuous slot 1718 that radially extends or flares outwardly approximately 6-30 mm from the holding channel 1714. The sidewall 1704 or flange portion includes a lower terminal surface 1730 that defines the lower extent of the discontinuous slot 1718 and is preferably arcuate to effectively and safely retain a reel post 206. Each of the locking apertures 1722a-n respectively face at least one of the first plurality of locking apertures 1724a-n. The locking bar 1720 is selectively disposed in one of the first plurality of locking apertures 1722a-n and one of the second plurality of locking apertures 1724a-n after the reel post 206 is placed in the discontinuous slot 1718, i.e., above the reel post 206, to prevent longitudinal movement of the reel post 206 out of the discontinuous slot 1718. The flange portion or thickness of the sidewall 1704 is of a length sufficient to define the locking apertures 1722a-n, 1724a-n sufficient to receive the locking bar 1720. The first and second plurality of locking apertures 1722a-n, 1724a-n are each respectively longitudinally aligned and spaced approximately 25 mm and equally from one another.

The locking bar 1720 is of a substantially rigid material, e.g., stainless steel, selectively removably coupled to the rod holder body 1702, selectively disposed in the at least two opposing locking apertures 1722a, 1724a, disposed in a locked position having longitudinally restricted movement, e.g., by the material of the sidewall 1704 defining the locking apertures 1722a-n, 1724a-n. The locking bar 1720 is disposed through the discontinuous slot 1718 to prevent longitudinal of the reel post 206. With reference to FIG. 17 and FIGS. 19-20, the locking bar 1720 includes a first end 1900, a second end 1902 opposing the first end 1900 of the locking bar 1720, a locking bar length 1904 separating the first and second ends 1900, 1902 of the locking bar 1720, and defines a locking aperture 1904 along the locking bar length 1904. The locking aperture 1904 preferably extends completely through the locking bar 1720 and is of a sufficient shape and size to receive a locking fastener 1726 therethrough. Said another way, the locking fastener 1726 is disposed in the locking aperture 1904 and is operably configured to prevent the locking bar 1720 from being selectively removed from the rod holder body 1702, or in an exemplary movement direction depicted in FIG. 18 with arrow 1802. Said differently, the locking bar 17020 is couplable to the rod holder body 1702 and is operably configured to selectively translate along a rod locking path 1802 having a locked position preventing movement of the reel post 206 and a removed position with the portion of the locking bar 1720 not positioned in and/or adjacent to the discontinuous slot 1718 to permit the reel post 206 to removed upwardly from the upper opening of the discontinuous slot 1718. The locking fastener 1726 may be cotter pin, a keyed lock, and/or a wheeled combination lock.

To that end, the embodiment depicted in FIGS. 17-18 and FIGS. 21-23 includes a flange portion, or lip, that defines holes 1722a-n, 1724a-n therein where a locking bar 1720, e.g., a clevis pin, is inserted to secure all sizes of spinning reels. A locking fastener 1726, e.g., a lock with a 5 mm shackle, is inserted into the locking aperture 1904 disposed near the tip of the second end 1902 to keep the locking bar 1720 from being removed. Said another way, the locking aperture 1904 is disposed proximal to (i.e., at or near, within 25% of the overall length near) the second end 1902 of the locking bar 1720. In a preferred embodiment, the locking bar 1720 includes a flanged head 1906 disposed proximal to the first end 1900 of the locking bar 1720 and is of a diameter greater than a diameter one of the least two opposing locking apertures 1722a, 1724a. As such, the locking bar 1720 is operable to be placed through the locking apertures 1722a, 1724a until the head 1906 reaches to the outer surface 1716 of the sidewall 104 and to expose the locking aperture 1904. In preferred embodiments, the locking bar 1720 is chamfered or countersunk around the perimeter defining the locking aperture 1904 to prevent rattling and secure retention of the fastener 1726 disposed within the locking bar 1720. In another embodiment, the locking bar 1720 may omit the flanged head 1906 and include two locking apertures on opposite sides of the locking bar 1720 for receiving a locking fastener.

The bottom end 1708 may also defines a bottom aperture thereon, wherein the holding channel 1714 continuously spans and separates the upper aperture 1710 and the bottom aperture. The assembly 100 also includes a holder clamping member 1728, that may be composed of two separate halves, that may be directly, translatably, and selectively removably coupled to the rod holder body 1702 and selectively rotatably coupled to a free end surface operably configured for selectively locked retention to a truck bed. Additionally, the assembly 100 includes a front plurality and a rear plurality of locking notches disposed longitudinally along the outer surface of the sidewall 1704 of the rod hold body 1702 and disposed, respectively, on opposing side surfaces 1716 of the sidewall 1704 of the rod hold body 1702, wherein the holder clamping member 1728 includes front and rear locking notches disposed, respectively, on opposing side surfaces of the holder clamping member 1728 (best exemplified in FIG. 23) and having a complementary coupling configuration with respect to the front plurality and a rear plurality of locking notches disposed on the outer surface 1716 of the sidewall 1704 of the rod hold body 1702. The locking notches and holder clamping member 1728 also includes the same and similar features to the locking notches and the holder clamping member described above and as depicted in FIGS. 1-4. Additionally, the assembly 100 may also include a second rod hold body with a locking bar, a locking fastener, and a holder clamping member utilized therewith and a first and second holder arm assembly.

Figure 24:
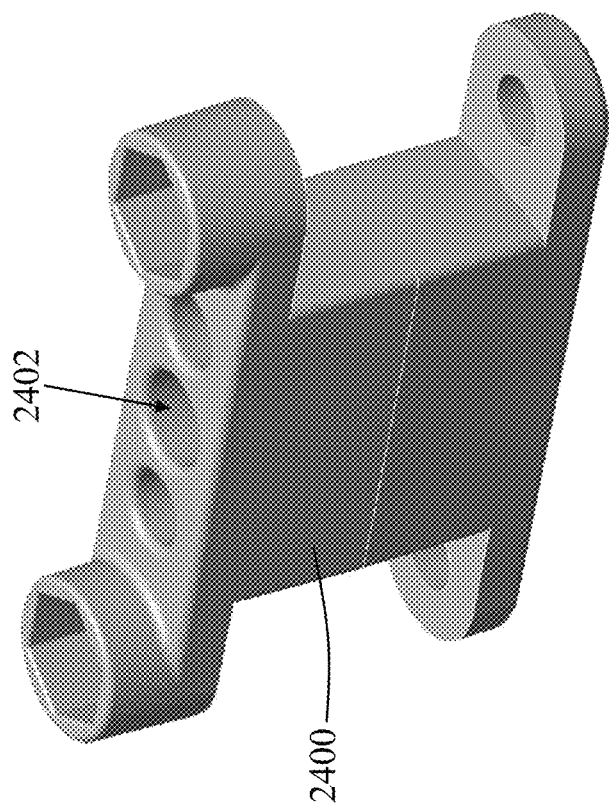
FIG. 24 depicts an intermediate pivoting member utilized with a first and second holder arm assembly in accordance with one embodiment of the present invention.

With reference to FIG. 6 and FIG. 24, the intermediate pivoting member 602 depicted in FIG. 6 may be modified to an intermediate pivoting member 2400 shown in FIG. 24 to include another aperture shaped, sized, and configured to receive the locking bar 1720 when not utilized to retainer the reel post 206.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A vehicle fishing rod holder comprising:
 a rod holder body having a sidewall with an upper end defining an upper aperture, a bottom end opposing the upper end, a body length separating the upper and bottom ends, an inner surface defining a holding channel spanning from the upper aperture toward the bottom end, an outer surface opposing the inner surface, defining at least two opposing locking apertures facing one another, and defining a discontinuous slot extending from the upper end and terminating along the body length;

a locking bar selectively removably coupled to the rod holder body, selectively disposed in the at least two opposing locking apertures, disposed in a locked position having longitudinally restricted movement, disposed through the discontinuous slot, with a first end, with a second end opposing the first end of the locking bar, a locking bar length separating the first and second ends of the locking bar, and defining a locking aperture along the locking bar length;

a locking fastener disposed in the locking aperture and operably configured to prevent the locking bar from being selectively removed from the rod holder body; and a holder clamping member directly, translatably, and selectively removably coupled to the rod holder body and selectively rotatably coupled to a free end surface operably configured for selectively locked retention to a truck bed.

2. The vehicle fishing rod holder according to claim 1, wherein the bottom end further comprises:
a bottom aperture defined thereon, wherein the holding channel continuously spans and separates the upper aperture and the bottom aperture.

3. The vehicle fishing rod holder according to claim 2, wherein:
the rod holder body is elongated and the holding channel is cylindrical.

4. The vehicle fishing rod holder according to claim 1, further comprising:
a front plurality and a rear plurality of locking notches disposed longitudinally along the outer surface of the sidewall of the rod hold body and disposed, respectively, on opposing side surfaces of the sidewall of the rod hold body, the holder clamping member including front and rear locking notches disposed, respectively, on opposing side surfaces of the holder clamping member and having a complementary coupling configuration with respect to the front plurality and a rear plurality of locking notches disposed on the outer surface of the sidewall of the rod hold body.

5. The vehicle fishing rod holder according to claim 4, wherein:
the front plurality and the rear plurality of locking notches extending at least 50% of the body length and equally spaced with respect to one another on the opposing side surfaces of the sidewall of the rod hold body.

6. The vehicle fishing rod holder according to claim 4, wherein the outer surface of the sidewall of the rod hold body further comprises:
a left plurality and a right plurality of locking notches disposed longitudinally along the outer surface of the sidewall of the rod hold body and disposed, respectively, on opposing side surfaces of the sidewall of the rod hold body, the front plurality, the rear plurality, the left plurality and the right plurality of locking notches: extending at least 50% of the body length and equally spaced with respect to one another on the respective opposing side surfaces of the sidewall of the rod hold body; and of a complementary coupling configuration with respect to the front and rear locking notches and a left and a right locking notch, respectively, of the holder clamping member.

7. The vehicle fishing rod holder according to claim 4, wherein the holder clamping member further comprises:
two collar members each with an inner surface having, respectively, the front plurality and the rear plurality of locking notches, the two collar members removably and directly coupled together with at least one fastener to contour and surround a perimeter of the outer surface of the rod holder body, the complementary coupling configuration restricting longitudinal movement of the rod holder body respect to the two collar members.

8. The vehicle fishing rod holder according to claim 1, wherein the holder clamping member further comprises:
a serrated fastener selectively rotatably coupled in a rotationally locked position with respect to the free end surface through a complementary serrated fastener.

9. The vehicle fishing rod holder according to claim 1, wherein:
the locking aperture is disposed proximal to the second end of the locking bar.

10. The vehicle fishing rod holder according to claim 1, further comprising:
a second rod holder body having a sidewall with an upper end defining an upper aperture, a bottom end opposing the upper end of the sidewall of the second rod holder, a body length separating the upper and bottom ends of the sidewall of the second rod holder, an inner surface defining a holding channel spanning from the upper aperture toward the bottom end of the sidewall of the second rod holder, an outer surface opposing the inner surface of the sidewall of the second rod holder, defining at least two opposing locking apertures facing one another, and defining a discontinuous slot extending from the upper end of the sidewall of the second rod holder and terminating along the body length of the sidewall of the second rod holder;

a locking bar selectively removably coupled to the rod holder body of the sidewall of the second rod holder, selectively disposed in the at least two opposing locking apertures defined by the sidewall of the second rod holder, disposed in a locked position having longitudinally restricted movement, disposed through the discontinuous slot defined by the sidewall of the second rod holder, with a first end, with a second end opposing the first end of the locking bar coupled to the second rod holder, a locking bar length separating the first and second ends of the locking bar coupled to the second rod holder, and defining a locking aperture along the locking bar length;

a locking fastener disposed in the locking aperture defined by the locking bar coupled to the second rod holder and operably configured to prevent the locking bar from being selectively removed from the second rod holder body;

a holder clamping member directly, translatably, and selectively removably coupled to the second rod holder body and selectively rotatably coupled to the free end surface operably configured for selectively locked retention to the truck bed; and a first holder arm assembly coupled to the rod holder body and the free end surface and a second holder arm assembly coupled to the second rod holder body and the free end surface, the first and second holder arm assemblies operably configured to independently rotate the rod holder body and the second rod holder body, respectively, with respect to one another.

11. The vehicle fishing rod holder according to claim 10, wherein the first holder arm assembly and the second holder arm assembly each further comprise:
   an intermediate pivoting member operably configured to generate two joints operably configured to generate two degrees of freedom (DOF) rotationally and defining an aperture thereon shaped and sized to receive the locking bar therein.

12. The vehicle fishing rod holder according to claim 10, wherein the first holder arm assembly and the second holder arm assembly further comprise:
   a mounting member with both the first holder arm assembly and the second holder arm assembly directly coupled thereto and having at least one hinge member with the first holder arm assembly and the second holder arm assembly directly coupled thereto.

13. The vehicle fishing rod holder according to claim 1, wherein the sidewall of the rod holder body further comprises:
   a first plurality of locking apertures longitudinally aligned with one another; and
   a second plurality of locking apertures longitudinally aligned with one another and each respectively facing at least one of the first plurality of locking apertures, the locking bar selectively disposed in one of the first plurality of locking apertures and one of the second plurality of locking apertures.

14. The vehicle fishing rod holder according to claim 1, wherein the locking bar further comprises:
   a flanged head disposed proximal to the first end of the locking bar and of a diameter greater than a diameter one of the least two opposing locking apertures.

15. A vehicle fishing rod holder comprising:
   a rod holder body having a sidewall with an upper end defining an upper aperture, a bottom end opposing the upper end, a body length separating the upper and bottom ends, an inner surface defining a holding channel spanning from the upper aperture toward the bottom end, an outer surface opposing the inner surface, defining a first plurality of locking apertures longitudinally aligned with one another, a second plurality of locking apertures longitudinally aligned with one another and each respectively facing at least one of the first plurality of locking apertures, and defining a discontinuous slot extending from the upper end and terminating along the body length;
   a locking bar selectively removably coupled to the rod holder body, selectively disposed in one of the first plurality of locking apertures and one of the second plurality of locking apertures, disposed in a locked position having longitudinally restricted movement, disposed through the discontinuous slot, with a first end, with a second end opposing the first end of the locking bar, a locking bar length separating the first and second ends of the locking bar, and defining a locking aperture along the locking bar length; and
   a locking fastener disposed in the locking aperture and operably configured to prevent the locking bar from being selectively removed from the rod holder body.

16. The vehicle fishing rod holder according to claim 15, further comprising:
   a holder clamping member directly, translatably, and selectively removably coupled to the rod holder body and selectively rotatably coupled to a free end surface operably configured for selectively locked retention to a truck bed.

17. The vehicle fishing rod holder according to claim 16, further comprising:
   a front plurality and a rear plurality of locking notches disposed longitudinally along the outer surface of the sidewall of the rod hold body and disposed, respectively, on opposing side surfaces of the sidewall of the rod hold body, the holder clamping member including front and rear locking notches disposed, respectively, on opposing side surfaces of the holder clamping member and having a complementary coupling configuration with respect to the front plurality and a rear plurality of locking notches disposed on the outer surface of the sidewall of the rod hold body.

18. The vehicle fishing rod holder according to claim 15, wherein the locking bar further comprises:
   a flanged head disposed proximal to the first end of the locking bar and of a diameter greater than a diameter one of the first plurality of locking apertures.

\* \* \* \* \*